United States Patent Office 3,340,991
Patented Sept. 12, 1967

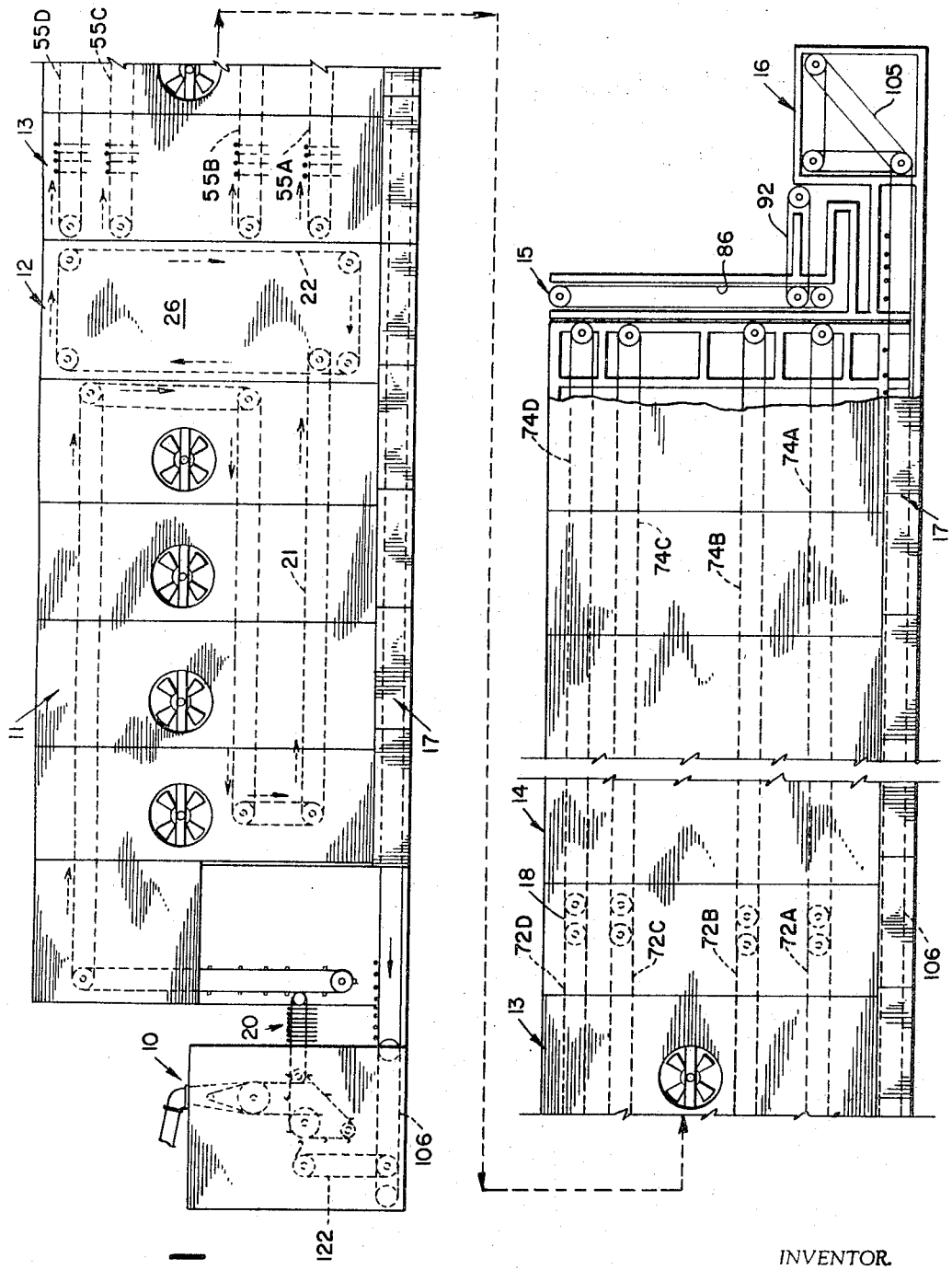

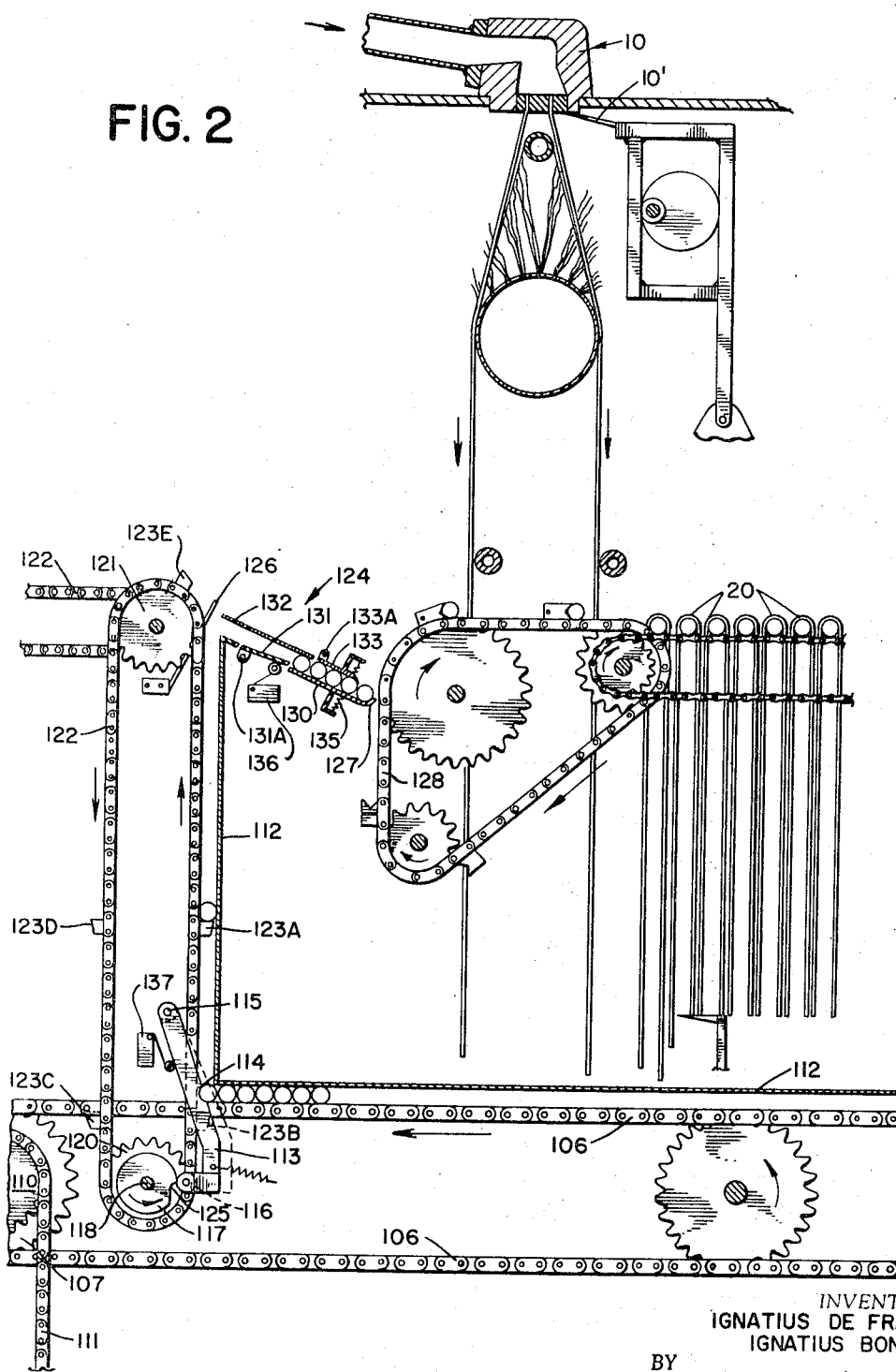

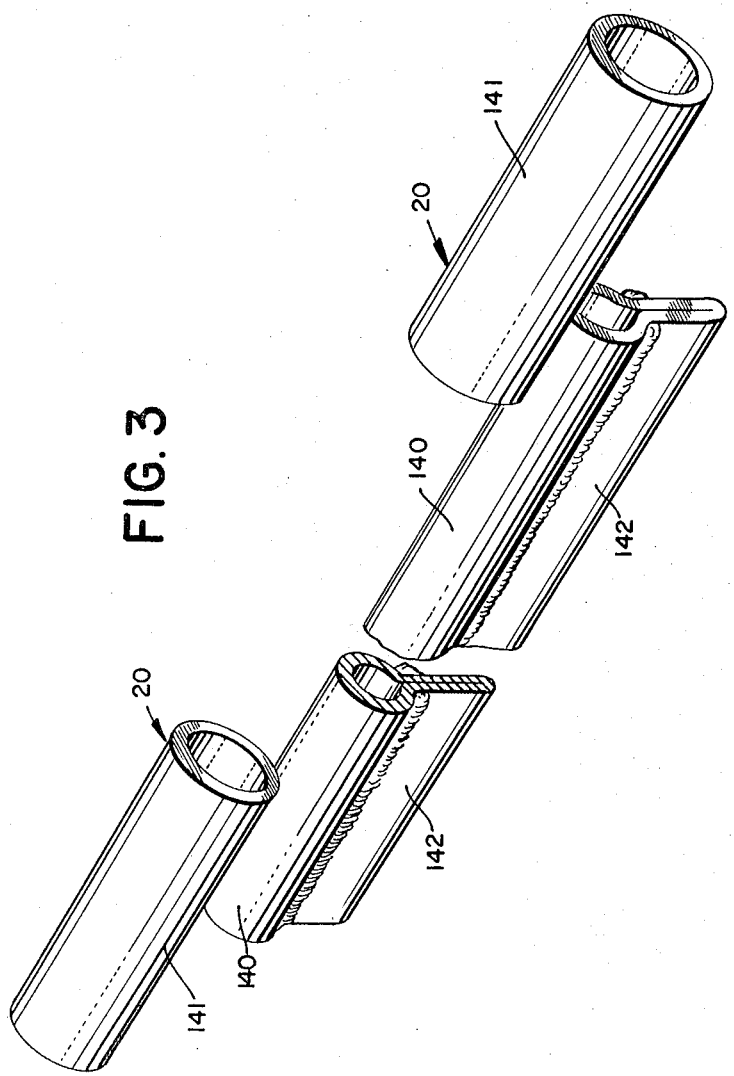

3,340,991
SPAGHETTI DRIER APPARATUS
Ignatius Bontempi, Douglaston, and Ignatius De Francisci, Glen Head, N.Y., assignors to De Francisci Machine Corporation, Brooklyn, N.Y., a corporation of New York
Original application Jan. 31, 1964, Ser. No. 341,647, now Patent No. 3,258,103, dated June 28, 1966. Divided and this application Apr. 13, 1966, Ser. No. 542,260
9 Claims. (Cl. 198—21)

ABSTRACT OF THE DISCLOSURE

Spaghetti drier apparatus for storing empty rack rods and feeding such rods to the spaghetti spreader, including rod stop mechanisms which store the rods on the rod return conveyor and actuate the transfer conveyer which transfers the rods from the rod return conveyor to the spreader, rod metering mechanisms adjacent the spreader for feeding rods to the spreader at a controlled rate, and an improved rod structure design for optimum rod handling on apparatus of this type.

---

This is a division of application Ser. No. 341,647, filed Jan. 31, 1964.

This invention relates to continuous spaghetti drying apparatus and more particularly to rack rods for conveying spaghetti through continuous driers and to apparatus for returning such rods for recycling through the drier after the dried spaghetti is stripped from them.

The basic spaghetti drying process and suitable apparatus for carrying out the process is described in full detail in our parent application, Ser. No. 341,647, filed Jan. 31, 1964, now Patent 3,258,103, and reference is made to that application for features not described herein. This invention relates to rack rods used in such continuous spaghetti drying processes. Also included in this invention is the rack rod return apparatus used to return empty rack rods for recycling through the drying process after the dried spaghetti has been removed from the rods.

It is an object of this invention to provide a novel rack rod that is especially adapted for use in continuous spaghetti drying processes because of its non-jamming and stable load bearing characteristics.

It is another object of this invention to provide apparatus in association with spaghetti dried equipment for returning empty rack rods from the spaghetti unloading point to the loading point of the drying operation for recycling through the drying operation.

It is a still further object of this invention to provide a means for storing and smoothly feeding empty rack rods to the spaghetti loading point of the drying operation, as such rods are required for such operation.

Other objects of this invention not at this time more particularly enumerated will be apparent from the accompanying description and drawings whichin:

FIGURE 1 is an elevation of a complete continuous spaghetti drying line embodying our invention and showing its relationship to the various components of the continuous line;

FIGURE 2 is a partial cross-sectional elevation of a spaghetti loading portion of the line of FIG. 1, showing a rack rod return, storage and feed mechanism made in accordance with our invention; and FIGURE 3 is an isometric view of a rack rod constructed in accordance with our invention.

To clarify the relationship of the invention disclosed herein to the complete spaghetti drying line, the several components of the line may be briefly summarized as follows.

Referring to FIGURE 1 the line generally comprises conventional spaghetti forming press 10, preliminary dried 11, input elevator 12, finishing dried 13 (comprising conventional first, second and third stage driers, only the initial part of the first stage and last part of third stage driers being shown) accumulator 14, discharge elevator 15 and stripper 16. Rack rod return mechanism 17 automatically returns empty rods from stripper 16 to press 10 and stores them there for re-use through the line. Also essential to the operation of the complete drier line are rack rod transfer apparatus 18, which serve to connect each of the above stages and components to the other.

Spaghetti is extruded, cut and loaded by press 10 on a succession of empty rack rods 20 in a conventional manner. Rods 20 carry the spaghetti through preliminary drier 11 to input elevator 12, which transfers the spaghetti laden rods 20 to and through finishing drier 13 and accumulator 14. After this rods 20 carry the spaghetti to stripper 16 which strips the spaghetti from rods 20 and transfers the spaghetti to weighing and packaging stations. Empty rack rods 20 are then return by rack rod return mechanism 17 to a position adjacent press 10.

Referring to FIGURE 2, the empty rack rods 20 are returned from the stripper (not shown in FIG. 2) by chain 106. Chain 106 is driven by sprocket 107 (partially shown), which is driven by coaxially mounted sprocket 110. Sprocket 110 is driven by chain 111 and a conventional motor (not shown). Rack rod return chain 106 runs continuously while the drier is in operation to return empty rack rods 20 to press 10. We have found it desirable to provide a two speed drive for chain 106, high speed for daytime operation when stripper 16 is normally in operation rapidly removing rods 20 from accumulator 14 and low speed when stripper 16 is normally off and only a low steady feed to press 10 is required.

Chain 106 returns empty rods to the front end of the drier adjacent press 10 where they are collected between the horizontal section of guide rail 112 positioned above the chain 106 at a distance which permits free slippage of chain 106 under the stored rods 20 beneath guide rail 112 without allowing rods 20 to bridge one another and jam up. Rods 20 are halted so as to slip on chain 106 by a pair of spring retained pivoted stops 113, each one being pivotally mounted about frame work 25 so as to engage the opposite ends of the first advancing empty rack rod 20. In normal operation a number of empty rack rods 20 are stored against stops 113.

Each stop 113 is provided with an arcuate recess 114 sized to house the lead rack rod 20 snugly to prevent its riding up and jamming. Stop 113 is pivoted about pin 115 mounted to framework 25 and provided with suitable bearings to permit free movement. At the opposite end of each stop 113 is cam roller 116 which bears against cam 117 mounted coaxially on shaft 118 with sprocket 120. The force of rack rods 20 bearing against stop 113 holds cam roller 116 in contact with cam 117.

Sprocket 120 is driven intermittently by a conventional motor (not shown) through sprocket 121 and chain 122. A group of equidistantly spaced rod support lugs 123 A-E are mounted on and moved counterclockwise by chain 122 (as viewed in FIG. 2) so as to pick up empty rods 20 from where they bear against stops 113. Support lugs 123 A-E carry rods 20 upwardly against a vertical extension of guide rail 112 until they are diverted to feed into spreader rack rod magazine generally designated 124 as will now be described.

As shown in FIGURE 2 when chain 122 is moved counterclockwise, rod support lug 123A rises to engage the leading rack rod 20. At the same time cam 117 is rotated counterclockwise. As cam 117 turns, cam recess 125 advances until cam roller 116 falls into a mating engagement, and this permits pivoting stop 113 to the left.

This allows the leading rack rod 20 to advance just far enough to clear the corner of guide rail 112 and be carried by lug 123B up and alongside the vertical run of rail 112. By the time rod 20 is in the vertical path of its advance, cam 117 has advanced and returned cam roller 116 to its normal position which returns stop 113 to its closed position (shown in solid line), thus stopping the feed of any more rods 20 under the horizontal run of guide rail 112. Actuation of chain 122 to cause these movements will be described later.

Chain 122 carries rod 20 up alongside the vertical run of guide rail 112 until it engages transfer plate 126 which is fixedly mounted by framework 25. When rod 20 engages plate 126 it is diverted off to the right (as viewed in FIG. 2) around the upper bend of guide rail 112 to fall into spreader rack rod magazine (generally designated 124).

Spreader rack rod magazine 124 is similar to a conventional rod delivery chute in that it extends downwardly and ends with a hook 127 which holds the leading rod 20 in position to be picked up by chain 128 which supplies empty rods to press 10. Additionally, in our apparatus we have a spring retained rod metering arrangement to take the load of the stored rods off the leading rod 20 held by hook 27. This arrangement comprises fixed lower chute 130, pivoted lower chute 131, fixed upper guide 132 and pivoted upper guide 133 terminating with partial hook 134. Chute 130 and guide 132 are fixed to framework 25, and chute 131 and guide 133 are pivoted about pins 131A and 133A respectively which are fixed to framework 25.

Drawing upper guide 133 toward lower chute 130 is spring 135. Tension in spring 135 is selected to provide a holding force between guide 133 and chute 130 just short of that required to hold back rods 20 when the lead rod 20 is lifted away from hook 127 by chain 128.

Adjacent the lower end of pivoted chute 131 is normally closed microswitch 136, the trigger of which is positioned so as to open switch 136 whenever a rod 20 is positioned between pivoted chute 131 and fixed upper guide 132.

Movement of chain 122 to advance lugs 123A–E and thereby convey rods 20 up the vertical run to spreader rod magazine 124 is controlled by two conditions: (1) Readiness of magazine 124 to receive more rods 20 (if magazine 124 is full, chain 122 should not deliver any more rods 20) and (2) Chain 122 should not advance to pick-up a rod 20 until it is aligned transverse to chain 122. With respect to the first condition, readiness of magazine 124 to receive rods 20, this is controlled by the position of microswitch 136. If magazine 124 is full, pivoted chute 131 swings down to open switch 136 which opens the electrical circuit supplying power to the motor that drives the chain 122. The second condition, correct transverse rod 20 alignment to chain 122, is controlled by a pair of normally open microswitches 137. When lead rod 20 is aligned transverse to chain 122, microswitches 137 are closed by stops 113 so as to close the electrical circuit to the motor driving chain 122, causing chain 122 to advance and carry rod 20 to magazine 124 unless magazine is already full (in which case switch 136 would have opened the circuit to the motor and thus prevented chain 122 from advancing). Dash lines show the position of stops 113 when leading rod 20 has not yet arrived in its aligned position for pick-up.

Another important feature of our invention is the structure and operation of rod 20. We have found that by using the structure for rod 20 as depicted in FIGURE 3, operating characteristics of rods 20 are vastly improved. Referring to FIGURE 3, bar 140 is the portion of rod 20 on which the spaghetti is draped. Welded to each end of bar 140 is tube 141 of slightly larger diameter which is the portion of rod 20 that rides on chains such as rod return chains 106; tubes 141 are the support members for each rod 20 which ride on the chains. Extending downwardly from bar 140 is ridge 142. While bar 140 and ridge 142 are illustrated as having a deformed tubular cross section, these parts may be fabricated of a single piece of solid stock, or ridge 142 may be welded to bar 140.

The purpose of this construction becomes apparent when the problems of conveying spaghetti on rods through a drier are considered. The carrying rods must not roll on the conveyor chains because this will tend to either roll the spaghetti off the rod or at least disturb the uniform distribution of the spaghetti on the rod. Ridge 142 and suspension of bar 140 from tubular supports 141 combine to lower the center of gravity of rod 20 well below its axis of suspension and thus tend to eliminate or damp out tendencies of rod 20 to turn about its axis of suspension. Ridge 142 is not essential if suspension of bar 140 is such that the center of gravity of the combined bar 140 and supports 141 is significantly lower than their moment of inertia about their axis of support on the conveyor chain.

Another problem found in conveying spaghetti on rods of the conventional type is that when rods 20 push up against each other the spaghetti is deformed or broken at the line of contact, or the spaghetti on adjacent rods sticks together. Such a crowding condition occurs in driers of the type described herein adjacent the input to elevator 12 (FIG. 1) and adjacent the discharge end of accumulator 14 just prior to pick-up by discharge elevator 15 where rods 20 frequently bunch up on the conveyor chains. Our novel rod 20 with tubular support 141 larger in diameter than bar 140 solves this problem since it prevents the contacting of spaghetti on adjacent rods.

While this description has dealt primarily with specific embodiments of our invention it should be understood that modifications and improvements which would be apparent to those skilled in the art can be made to the apparatus and still be within the scope of our invention. Therefore, while we have concentrated our description on various preferred embodiments of our invention, it will be understood that we shall not be limited by the foregoing description but solely by the claims granted to us.

What is claimed is:

1. A rack rod for conveying spaghetti comprising a central longitudinal bar over which said spaghetti may be draped, and a pair of supports at opposite ends of said bar for supporting said bar between the tracks of a dual tracked conveyor, said supports being positioned relative to said bar such that the axis of support contact of said supports on said tracks is above the combined moment of inertia of said bar and supports when said rod is positioned on said conveyor for conveying spaghetti, and wherein said supports are larger in outside dimensions than said bar whereby such supports may abut against the same such supports of adjacent rack rods and maintain separation of the spaghetti draped on the bars of such adjacent rack rods.

2. A rack rod as claimed in claim 1 wherein said bar has a substantially circular shaped upper surface over which said spaghetti may be draped, and wherein said supports are substantially circular shaped with a diameter larger than the diameter of the upper surface of said bar.

3. A rack rod as claimed in claim 1 further comprising a lateral extension of said bar positioned to lower the center of gravity of said combined bar, supports and extension when said rod is positioned on said conveyor for conveying spaghetti.

4. Rack rod as claimed in claim 2 further comprising a lateral extension of said bar positioned to lower the center of gravity of said combined bar, supports and extension when said rod is positioned on said conveyor for conveying spaghetti.

5. Rod return apparatus comprising in combination,
    (a) a rod return conveyor,
    (b) a pair of normally extended retractable stop means at the discharge end of the rod return conveyor for releasably holding a group of such rods on the conveyor while the conveyor continues to run under the stopped rods, each such stop means being positioned to block the opposite ends of the lead rod of such group so as to stop and align such rod for engagement by the rod transfer conveyor, (c) an upwardly disposed rod transfer conveyor positioned to receive rods released by the stop means from the rod return conveyor, (d) guide rail means positioned parallel above the rod return conveyor and spaced from the rod transfer conveyor a distance permitting only a single row of such rods to pass between the guide rail means on one side and both the rod return conveyor and rod transfer conveyor on the other, but allowing the rod return conveyor to run under the stopped rods resting thereon and thereby exert a frictional force on such rods in the direction of travel of the rod return conveyor, (e) said stop means being retractable to first and second retracted positions by the pressure exerted thereon by the lead rod on the rod return conveyor, (f) first actuating means operatively connecting said stop means to the rod return conveyor for actuating such conveyor when said stop means are retracted to the first retracted position, (g) second actuating means operatively connecting said stop means to the rod return conveyor for preventing retraction of said stop means to the second retracted position until after the rod transfer conveyor has been actuated and is ready to engage the lead rod held by said stop means, (h) the first retracted position of said stop means preventing passage of the lead rod between said stop means and the guide rail means, and said second retracted position permitting passage of such lead rod through the space between said retracted stop means and the guide rail means.

6. Rod return apparatus as claimed in claim 5, wherein said stop means comprise retractable arms, each having an arcuate recess which in cooperation with the guide rail means holds the lead rod and all successively stopped rods against horizontal and vertical movement when said stop means are in their fully extended and first retracted positions, said arcuate recesses permitting passage of only a single lead rod each time said stop means are retracted to their second retracted position.

7. Rod return apparatus as claimed in claim 5 further comprising rod storage means at the discharge end of the rod transfer conveyor for receiving and storing rods from such conveyor.

8. Rod return apparatus as claimed in claim 7 wherein said rod storage means comprises a movably mounted gate means positioned to engage and receive rods from said rod transfer conveyor, said gate means being movable between two positions depending on the number of rods contained therein, whereby said gate means allows operation of said first actuating means only when less than a predetermined number of rods are contained therein, said gate means moving to its second position when said number of rods are therein contained, said movement preventing further operation of said first actuating means until said gate means returns to its first position by discharge of rods therefrom.

9. Rod metering means comprising a lower rod support chute having a upwardly turned hook at its discharge end for holding and positioning each successive lead rod for engagement by a conveyor, a shorter upper guide spaced substantially parallel to the lower chute and having a downwardly turned hook at its discharge end for holding against the lower chute one or more rods contiguously to the lead rod held by such chute, and biasing means for releasably holding the lower chute and upper guide together with a force just below that required to hold the rods stopped by the downwardly turned hook when the lead rod is removed from the upwardly turned hook, whereby the downwardly turned hook releases the next successive lead rod which when stopped by the upwardly turned hook cooperates with the biased downwardly turned hook to hold back the next contiguous rod until such lead rod is then removed by said conveyor and the cycle then repeats itself.

References Cited

UNITED STATES PATENTS

| | | | |
|---|---|---|---|
| 1,970,574 | 8/1934 | Pelosi | 198—37 |
| 2,741,357 | 4/1956 | Surico | 198—21 |
| 2,986,263 | 5/1961 | Jones | 198—34 |
| 3,024,890 | 3/1962 | Belk | 198—34 |

EVON C. BLUNK, *Primary Examiner.*

EDWARD A. SPROKA, *Examiner.*